G. LARSON.
AUTOMATIC SLUICE GATE.
APPLICATION FILED DEC. 5, 1912.
1,089,232.
Patented Mar. 3, 1914.
2 SHEETS—SHEET 1.
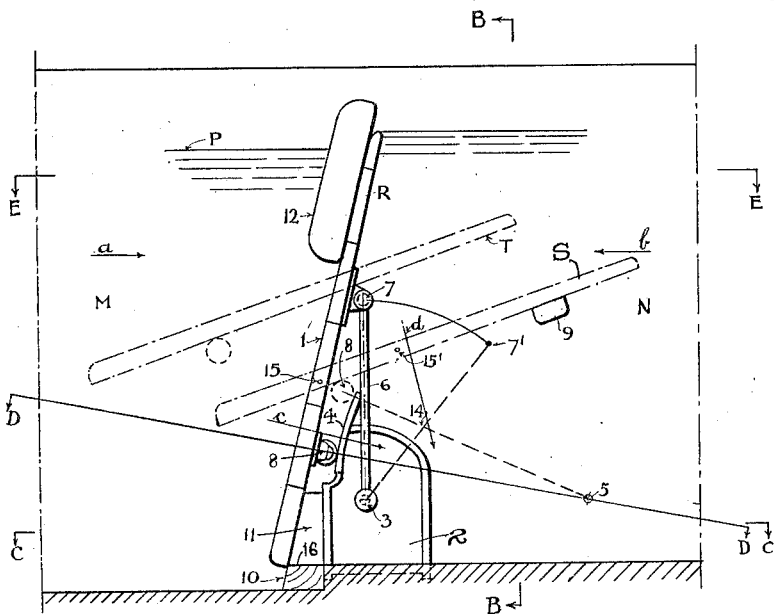
FIG. 1.
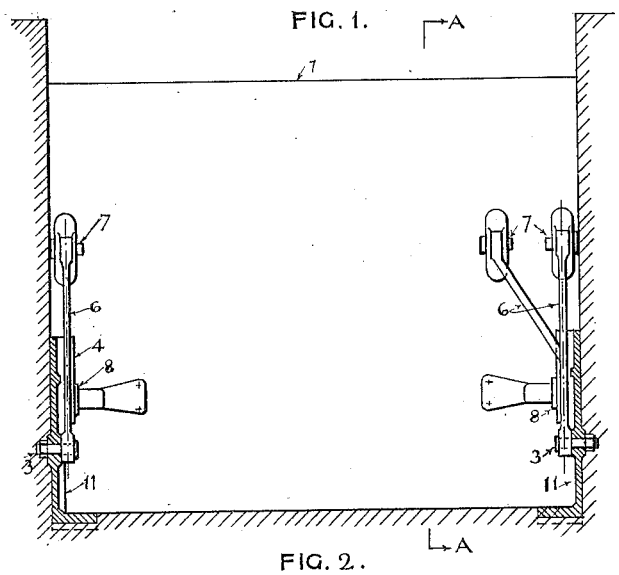
FIG. 2.
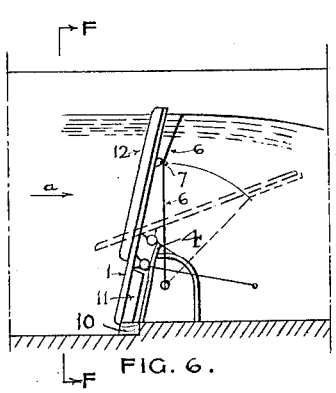
FIG. 6.
FIG. 7.
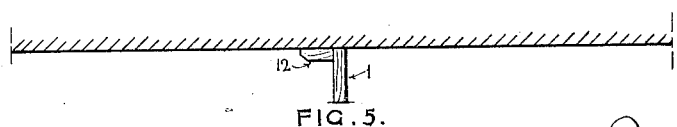
FIG. 5.

G. LARSON.
AUTOMATIC SLUICE GATE.
APPLICATION FILED DEC. 5, 1912.

1,089,232.

Patented Mar. 3, 1914.
2 SHEETS—SHEET 2.

Witnesses:
M. Roche
K. Peacock

Inventor:
Gustave Larson
by P. Singer Atty

UNITED STATES PATENT OFFICE.

GUSTAVE LARSON, OF BUENOS AIRES, ARGENTINA.

AUTOMATIC SLUICE-GATE.

1,089,232.  Specification of Letters Patent.  Patented Mar. 3, 1914.

Application filed December 5, 1912. Serial No. 735,088.

*To all whom it may concern:*

Be it known that I, GUSTAVE LARSON, subject of the Kingdom of Sweden, and resident of Buenos Aires, Argentina, have invented certain new and useful Improvements in Automatic Sluice-Gates, of which the following is a specification.

My invention refers to a new method or system of mounting or hanging sluice gates, and has for its principal object the provision of means for mounting the gate in such a manner as to open and shut automatically under certain predetermined conditions. Its principal application is (1) that of regulating the level of a body of water, serving as automatic flashboards or spillway gates, or (2) when double acting, for regulating the comparative levels of two bodies of water, such for instance as a canal passing alongside of lakes or reservoirs, for tapping the canal into the lake when the canal is above maximum level only, but tapping the lake into the canal whenever the canal is lower than the lake, and (3) to provide a balanced gate for permitting the flow of water in one direction but preventing it from flowing the opposite direction, as in drainage system, etc.

The improved sluice gate may be so installed as to be single or double acting, that is to say, so as to open or shut automatically under certain predetermined water levels from one side only or from either side.

Figure 3:
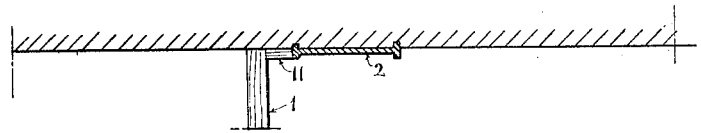
Figure 4:
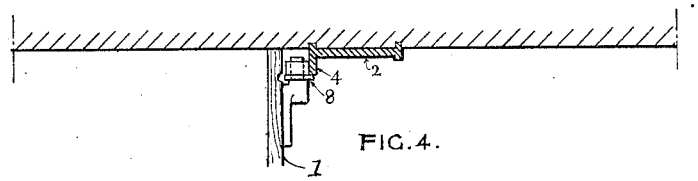
Figure 8:
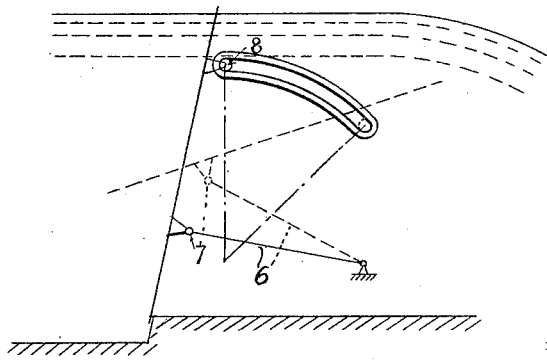
Figure 9:
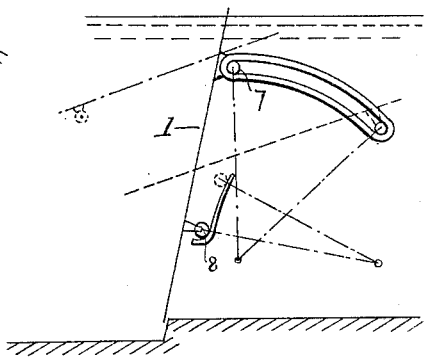
Figures 10, 11:
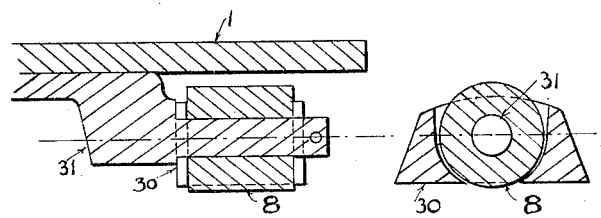

In the accompanying drawings: Figure 1.— is a sectional view of a preferred form of my improved sluice gate mounted for double action, showing in dotted lines its various positions and with reference to the Fig. 2 it may be considered as a section taken on the line A—A of the latter. Fig. 2.— is a sectional view on the line B—B of Fig. 1. Fig. 3.— is a sectional view on the line C—C of Fig. 1. Fig. 4.— is a sectional view on the line D—D of Fig. 1. Fig. 5.— is a sectional view on the line E—E of Fig. 1. Fig. 6.— is a view similar to Fig. 1 but showing the form of mounting for single action only, that is to say, to open or close for a flow of water in one direction alone. Fig. 7.— is a section taken on the line F—F of Fig. 6. Fig. 8.— is a diagram of a gate with the same balancing devices, but in a modified form as hereinafter explained, arranged for single action. Fig. 9.— represents another modified form on the same principle, arranged for double action. Figs. 10 and 11.— are details of roller guards.

Referring now to Figs. 1 to 5, 1 is the gate proper, to which are rigidly attached the bearing brackets 7 pivotally connected to the upper end of the arm 6, the lower end of which is pivotally connected by the pin 3 to the sides of the sluice way. The lower part of the gate 1 is supported by means of rollers 8 mounted in bearings rigidly connected to the gate, and running on a guide 4 in the form of an arc described from the point 5, and supported by the frame 2 attached to the sluice way. 9 is a stop projecting from the side of the sluice way, 10 is the sill, and 11 Fig. 3 and 12 Figs. 1 and 7 are stops which also serve as joint tighteners.

In explaining the working of my invention, reference will be made to "Action 1" when the water level is higher on the left hand or "M" side of the gate, and "Action 2" when the water level is higher on the right hand or "N" side of the gate, as shown in Fig. 1.

*Action 1.*—The water level being higher on the side M than on the side N, the gate closes for levels on the side M lower than P; for P level it opens and allows the water to flow in the direction indicated by the arrow *a* and again closes when the level on the side M reaches a point slightly lower than P. The demonstration of this action is as follows: When the gate is closed and the M side level at P, let it be supposed first that there is no water on the side N; in which case the resultant of water pressure from M side is at *c*, the center of rotation of the gate at 14 which is the intersection of the straight line 3—7 with the roller guide radial line 5—8, because when the line 5—8 rotates around 5, the point 8 moves perpendicularly to the line 5—8. When the line 3—7 rotates around the point 3 the point 7 moves perpendicularly to the line 3—7. When the point 8 rotates around 14, said point 8 moves perpendicularly to the line 14—8 in the same manner, when 7 rotates around 14, the point 7 moves perpendicularly to the line 14—7. Consequently the point 14 is the common center of rotation for 8 and 7, and therefore for the gate also. The center of rotation is always at the intersection of a straight line through the pivotal centers of the arm 6, with the roller pressure line, which is the normal to contact point between roller and guide. The center of gravity of the gate is at 15. The water being at the level P, the opening moment (resultant of water pressure multiplied by the perpendicular distance of 14 from $c$) overcomes the closing moment (weight of gate multiplied by horizontal projection of 14—15). The water moves the gate from the closed position R to the open position S whereby the water flows under and over the gate in the direction shown by the arrow $a$. The resultant of water pressure is then at the line $d$ and this line passes to the N side of 14, this latter point being the intersection of the axis of the arm 6 with the pressure direction of the roller 8 on the guide 4, i. e., 5—8, and produces a moment which keeps the gate in the position S. When the water level sinks slightly below the level P, the resultant moves to the M side and may produce a closing moment and the gate may close by the joint action of the water pressure and its own weight or it may do so by its own weight alone.

Considering the effect of the water on the side N when the gate is performing the functions of "Action 1", we have, as above stated, a lower water level on the side N than on the side M. We consider first the case when the gate is closed. With rising water levels, the resultant of water pressure on the side M has a closing effect on the gate, which it presses against 10 and 11, incidentally effecting a good tightening of the contact, until it has reached the point 14, after which it tends to turn the gate open. The resultant of water pressure from the side N tends to open the gate until the level has reached the point where the resultant passes through 14, after which it would exert a closing influence. For levels below that critical height on the side N, we find that even if the levels were the same on both sides of the gate, the opening moment on the side N would not be as great as the closing moment from the side M, because the pressure exposed surface on the side N is less than that on the side M to the extent of the contact surface of the gate with 10 and 11, besides the leverage becomes (with M and N levels equal) smaller for the N side than for the M side pressure; therefore it is also clear that the N side water level must reach a point more than three times as high as the length of the perpendicular from the sill level 16 to the intersection of the N side face of gate with its perpendicular through 14, before it could prevent the gate from opening for the M side level at P. It therefore appears that the gate opens, even if the N side level or "back water" is nearly as high as the level P. Considering the closing in back water, the gate may be made to close in still water of any level, and will still more surely close in running water. When the gate is partially submerged in still water the buoyancy moves the center of gravity 15′ of the gate in the direction $a$, and in order to prevent the point 15 from going to the N side of 14, the gate will preferably be made of materials of little buoyancy, such as steel. The balancing for the intermediate position is analogous to that for the extremes R and S.

*Action 2.*—The water level on the N side being higher than that on the M side; when the water level on the N side rises from the sill level 16 it presses against the gate in the direction shown by the arrow $b$. The gate will then rotate around the point 7, as the water pressure has greater leverage when the gate rotates around 7 than around 14. The point 7 is placed sufficiently high to prevent any level on the side N producing a closing effect. The arm 6 leans against the end of the guide 4 so that it will not fall unduly forward in the direction $b$; the arm 6 may be stopped from falling in the direction $b$ by any other arrangement. As the super-pressure of the side N recedes, the gate closes by its own weight alone. For Action 2, the water runs in the direction shown by the arrow $b$ and may run under the gate, or over and under the same. In Figs. 6 and 7, the gate is shown with the same principle but so arranged as only to perform Action 1. The gate is cut on the lines 20, 21, 22 and 23 shown in the sectional view of Fig. 7.— so that when the gate opens the cuts, 23, 22, and 21 go over the stop 12 and the stops 11 and 12 act on opposite sides or faces of the gate. This produces a very good tightening effect. The arm 6 is extended beyond the point 7, and when the gate opens the prolongation of the arm approaches the gate until it comes in contact with and stops further movement of the gate relative to the arm 6. In Fig. 8 a gate is shown with the same balancing devices, but with the arm 6 and the roller contact 8 in inverted positions, i. e., the roller connection being above the pivotal arm connection. The gate shown in Fig. 9 is of the same kind with arrangement for Action 1 and Action 2, but both points 8 and 7 are led by guides.

In Figs. 10 and 11, details are shown of guards for the rollers 8, in which 30 is a guard, 31 a shaft and 8 the body of the roller, the guard 30 being so arranged that it can turn around the shaft 31 a fraction only of 360 degrees, the object of this device being to prevent solid bodies from lodging between rollers and guides. The advantages obtained by this form of gate are a reduction to a minimum of frictional losses, the elimination of counterweights and a notable simplicity and economy of construction as well as reliability of operation.

The device may be used for gates moved by external power, the advantages in this case being the facility of operation on account of balancing. It is understood that the balancing means consisting of the pivotally connected arm and the curved guide and roller, or the two guides and rollers as in the case of Fig. 9 may be arranged in pairs, one on either side of the sluice way, or repeated in several sets if so required by the extreme width of the sluice way, and that the arms 6 may be simple, as shown at the left hand of Fig. 2 or bifurcated as shown at the right hand of the same figure, or bent, or curved or T shaped. It is also understood that the forms of balancing means shown and described are given as specimen only, and that two or more rollers may be used instead of one on each guide and that a guide may be straight for part of its length or its entire length since it is evident that the arrangement of the various parts can be slightly varied without departing from the principle of the invention.

Having thus described and specified the nature of my invention and the manner in which the same is to be performed, what I claim and desire to secure by Letters Patent of the United States of America, is:—

1. In combination with a canal or sluice way, a gate, an arm pivotally connected at one end to the sluice and at the other to the gate, a guide to support the gate below its connection with the arm and a roller or the like connected to the gate, to facilitate the movement of the gate on the guide so as to admit opening or closing the gate by swinging around its upper connection alone with arm stationary; or so as to determine motion of gate by following the guide and arc of arm motion, substantially as and for the purposes hereinbefore described.

2. In combination with a sluice way, a gate, stops arranged to retain the gate in a normally closed position, and means to balance said gate so as to be automatically moved from and to said closed position, said balancing means comprising a pivotally connected arm, a guide and a roller, substantially as hereinbefore described.

3. In combination with a sluice way and a gate for the same, means for balancing said gate comprising an arm pivotally connected to said gate and to the sluice way, a guide connected to the sluice way and a roller attached to the gate, to facilitate its movement on said guide, substantially as and for the purposes hereinbefore described.

4. In combination with a sluice way, a gate, (such as 1) normally retained in a closed position by stops (such as 10 11 and 12) and balancing means to effect the automatic movement of said gate from or to said closed position, comprising a pivotally connected arm (such as 6) a guide (such as 4) and a roller or the like (such as 8) attached to the gate to facilitate the movement of the gate on the guide, substantially as hereinbefore described and illustrated in the accompanying drawings.

5. In combination with a sluice way, a gate, stops arranged to retain the gate in a normally closed position, means to balance said gate so as to be automatically moved to and from said closed position, said balancing means comprising a pivotally connected arm, a guide and a roller, and means to stop the opening movement of the gate and retain it in an inclined open position.

6. In combination with a sluice way, a gate, an arm pivotally connected at one end to the sluice way and at the other to the gate, a guide to support the gate in vertically spaced relation to its connection with the arm, a roller or the like connected to gate to facilitate the movement of the gate on the guide, and means such as a contact between the pivotal arm and the guide to limit the movement of the pivotal arm.

7. In combination with a sluice way, a gate, an arm pivotally connected at one end to the sluice way and at the other to the gate, a guide to support the gate in vertically spaced relation to its connection with the arm, a roller or the like, to facilitate the movement of the gate on the guide and means such as a stop 9 for limiting the opening movement of the gate substantially as and for the purposes hereinbefore described and illustrated in the accompanying drawings.

8. In combination with a sluice way, a gate, an arm pivotally connected at one end to the sluice way and at the other to the gate, a guide to support the gate in vertically spaced relation to its connection with the arm, a roller or the like fixed to the gate for facilitating the movement of the gate on the guide and means comprising a guard mounted on the roller shaft to prevent solid bodies from lodging between the roller and the guide.

9. The combination with a sluice way, a gate adapted to close said sluiceway under certain conditions of water pressure, said gate having upper and lower edges, a fixed guide, a roller pivotally connected to said gate and adapted to contact with said guide, said guide being substantially arc shaped as
5 to the surface intended to coöperate with said roller, said roller being secured to said gate relatively near one of said edges, and means secured to said gate relatively near the other of said edges for compelling the point of connection between itself and the 10 gate to move in a substantially circular path.

Signed at Buenos Aires, Argentina, this 16th day of October, 1912.

GUSTAVE LARSON.

Witnesses:
 R. W. HUNTINGTON,
 MECHAN SCHUBERT.

---

Copies of this patent may be obtained for five cents each, by addressing the "Commissioner of Patents, Washington, D. C."